United States Patent
Schelling

(10) Patent No.: US 11,224,919 B2
(45) Date of Patent: Jan. 18, 2022

(54) METHOD FOR CORRECTING AN AXIAL POSITION OF A WORKPIECE SUPPORT

(71) Applicant: Amann Girrbach AG, Koblach (AT)

(72) Inventor: Peter Schelling, Hohenems (AT)

(73) Assignee: Amann Girrbach AG, Koblach (AT)

( * ) Notice: Subject to any disclaimer, the term of this patent is extended or adjusted under 35 U.S.C. 154(b) by 203 days.

(21) Appl. No.: 16/583,780

(22) Filed: Sep. 26, 2019

(65) Prior Publication Data

US 2020/0016709 A1 Jan. 16, 2020

Related U.S. Application Data

(62) Division of application No. 15/305,473, filed as application No. PCT/AT2015/000064 on May 4, 2015, now abandoned.

(30) Foreign Application Priority Data

May 7, 2014 (DE) .......................... 102014106331.7

(51) Int. Cl.
| | |
|---|---|
| *B23B 1/00* | (2006.01) |
| *B23Q 3/18* | (2006.01) |
| *A61C 13/00* | (2006.01) |
| *B23Q 17/00* | (2006.01) |
| *A61C 13/12* | (2006.01) |
| *B23Q 3/12* | (2006.01) |

(52) U.S. Cl.
CPC ................ *B23B 1/00* (2013.01); *B23Q 3/183* (2013.01); *A61C 13/0022* (2013.01); *A61C 13/12* (2013.01); *B23Q 3/12* (2013.01); *B23Q 2017/001* (2013.01)

(58) Field of Classification Search
CPC .. B23B 1/00; B23B 3/04; B23Q 3/183; B23Q 3/186; B23Q 3/105; B23Q 3/12; B23Q 2017/001; Y10T 279/25; Y10T 279/26
See application file for complete search history.

(56) References Cited

U.S. PATENT DOCUMENTS

| 1,372,577 A | 3/1921 | Wallenberg |
| 2,290,341 A | 7/1942 | Levitt |
| 2,358,300 A | 9/1944 | Benjamin et al. |

(Continued)

FOREIGN PATENT DOCUMENTS

| DE | 4034977 | 5/1992 |
| DE | 69107423 | 2/1995 |

(Continued)

*Primary Examiner* — Ryan Rufo
(74) *Attorney, Agent, or Firm* — Volpe Koenig

(57) ABSTRACT

A method of correcting an axial position of a workpiece support (1) used for removing material from a dental workpiece (2) which is held by the workpiece support (1) and is rotated together with the workpiece support (1) about a drive rotation axis (3) when material is being removed. The workpiece support (1) has at least two workpiece support parts (4, 5, 6) which can be separated from each other and connected to each other. One of the workpiece support parts (4, 5) has at least one compensation region (7) with a material projection (8) for introducing a compensation surface (9) by removing material, and the other workpiece support part (6) has a seating surface (10) for connecting to the compensation surface (9) in a form fitting manner.

9 Claims, 12 Drawing Sheets

(56) References Cited

U.S. PATENT DOCUMENTS

| | | | |
|---|---|---|---|
| 4,211,425 | A | 7/1980 | Halvorsen |
| 4,932,640 | A | 6/1990 | Shirakawa |
| 5,042,826 | A | 8/1991 | Garnett |
| 5,147,091 | A | 9/1992 | Yonezawa et al. |
| 8,820,726 | B2 | 9/2014 | Yeom |
| 2002/0069498 | A1 | 6/2002 | Albeck et al. |
| 2007/0033787 | A1* | 2/2007 | Shibata ................ B23P 15/003 29/233 |
| 2007/0290457 | A1 | 12/2007 | Walters |
| 2009/0013063 | A1 | 1/2009 | Soman |
| 2009/0023112 | A1 | 1/2009 | Ganley et al. |
| 2009/0274994 | A1 | 11/2009 | Jung et al. |
| 2010/0028834 | A1 | 2/2010 | Galehr |
| 2011/0018184 | A1 | 1/2011 | Steger |
| 2011/0042880 | A1 | 2/2011 | Konrad et al. |
| 2013/0244846 | A1 | 9/2013 | Koch |
| 2015/0099243 | A1 | 4/2015 | Steger |
| 2015/0217380 | A1 | 8/2015 | Haimer |

FOREIGN PATENT DOCUMENTS

| | | |
|---|---|---|
| DE | 10204267 | 4/2003 |
| DE | 4423932 | 7/2008 |
| DE | 102009059256 | 6/2011 |
| DE | 202011109954 | 12/2012 |
| DE | 102011109939 | 2/2013 |
| DE | 102012107546 | 2/2014 |
| DE | 202011110606 | 2/2015 |
| EP | 1186373 | 3/2002 |
| WO | 2009100863 | 8/2009 |
| WO | 2013020147 | 2/2013 |

* cited by examiner

METHOD FOR CORRECTING AN AXIAL POSITION OF A WORKPIECE SUPPORT

INCORPORATION BY REFERENCE

The following documents are incorporated herein by reference as if fully set forth: U.S. patent application Ser. No. 15/305,473, filed Oct. 20, 2016; PCT Application No. PCT/AT2015/000064, filed May 4, 2015; and German Patent Application No. 10 2014 106 331.7, filed May 7, 2014.

BACKGROUND

The present invention relates to a workpiece support for the machining of a dental workpiece, which is retained by the workpiece support and, during the machining, is rotated together with the workpiece support about an drive rotation axis. Furthermore, the invention also relates to a method of correcting the axial position of a workpiece support.

WO 2013/020147 A1 discloses, for example, a machine tool for the machining of a dental workpiece. During the machining, the workpiece is retained in a workpiece support. In WO 2013/020147 A1, the workpiece support can be rotated together with the workpiece about an drive rotation axis in order to create optimum accessibility for the material-removal tool, e.g. a milling or grinding head. However, in WO 2013/020147 A1, the workpiece supports used therein are not designed so that the workpiece retained by the workpiece support, during the machining, is rotated together with the workpiece support about the drive rotation axis. For this purpose, that is to say for so-called rotary machining, in which the workpiece is rotated, preferably permanently, about the drive rotation axis during the machining, other workpiece supports are required. FIGS. 1 and 2 of this application show straightforward embodiments of such workpiece supports.

Practice shows that rotary machining using such straightforward workpiece supports, as are shown in FIGS. 1 and 2 of this application, gives rise to problems with the axial position. In specific terms, deviations or offsets can be seen in practice between the drive rotation axis and the axis of workpiece rotation and/or axis of symmetry running through the workpiece. These result from inaccuracies in the execution of the workpiece support and/or also of the driveshaft of the machine tool. These offsets in the axial position give rise to imbalances during rotation of the workpiece, which should be very much avoided during rotary machining.

SUMMARY

It is an object of the invention to create a workpiece support in which such errors in the axial position can be corrected.

This is achieved by a workpiece support according to one or more features of the invention.

Provision is therefore made, in the case of the workpiece support according to the invention, for the workpiece support to have at least two workpiece-support parts, which can be separated from one another and connected to one another, wherein one of the workpiece-support parts has at least one compensation region with a material overhang for introduction of a compensation surface by way of material removal, and the other one of the workpiece-support parts has a seat surface for form-fitting connection to the compensation surface.

In other words, the workpiece support according to the invention is therefore constructed from a number of parts. At least one of these workpiece-support parts has present on it a compensation region with a material overhang, in which a compensation surface for compensating for, or correcting, errors in the axial position can be made by way of material removal. It is then possible, following this machining, for the seat surface of at least one other of the workpiece-support parts to be positioned in a form-fitting manner on said compensation surface. The seat surface and the compensation surface here form preferably a play-free form fit. In preferred variants, provision is made, prior to the compensation surface being formed in the compensation region by means of material removal, for it not to be possible for the workpiece-support parts to be connected to one another, or at least not in the same way as after the compensation surface has been formed, due to the material overhang then still being present in its entirety in the compensation region.

It should be pointed out here that it is possible, but not necessary, for the form fit between the seat surface and compensation surface to be present on a permanent basis. It may also be sufficient, to provide precise orientation of the workpiece-support parts in relation to one another according to the invention, for the form fit between the seat surface and compensation surface to be established only upon connection of the seat surface and compensation surface or of the workpiece-support parts. Provision may be made, for example, for the workpiece-support parts, while this form fit is established, possibly also to be connected to one another at a different location in addition, preferably integrally, for example by adhesive bonding, soldering, welding, screw connection or the like, and therefore the form fit does indeed ensure precise orientation when the seat surface and compensation surface are being connected to one another. However, thereafter, when the precise orientation of the workpiece-support parts is maintained by other types of connection, it is also possible for the form fit between the seat surface and compensation surface to be removed again. It is thus, for example, possible to establish the form fit between the seat surface and compensation surface via a connecting adapter, to connect the workpiece-support parts to one another thereafter integrally or in some other way, to provide additional permanent connection, and then to remove the connecting adapter, and therefore the form fit, again. This will be demonstrated hereinbelow likewise by means of an exemplary embodiment.

The compensation surface, which is made in the compensation region by the aforementioned machining, is, preferably in part or in its entirety, in the form of a cylinder shell or of otherwise rotationally symmetrical shaping. The compensation surface is made in the compensation region preferably such that an axis of symmetry of the cylinder-shell or otherwise rotationally symmetrical shape of the compensation surface, said shape being formed by machining, is coaxial with the drive rotation axis. The compensation surface is preferably entirely in the form of a cylinder shell or at least entirely rotationally symmetrical in relation to the axis of symmetry. However, this is not imperative. It is also sufficient if the compensation surface is only partially in the form of a cylinder shell or otherwise rotationally symmetrical. In the latter case, however, provision is advantageously made for surface regions which may be present in the compensation region and differ from the cylinder-shell or otherwise rotationally symmetrical shape to be located closer to the axis of symmetry than the cylinder-shell or otherwise rotationally symmetrical shape of the compensation surface. In other words, it is therefore preferably the case that the surface regions which differ from the cylinder-shell or otherwise rotationally symmetrical shape should not project in the radial direction, as seen from the axis of symmetry, beyond the cylinder-shell or otherwise rotationally symmetrical shape of the compensation surface.

Preferred embodiments of the invention make provision for the seat surface to encase a cavity, into which the compensation surface can be introduced for form-fitting connection of the seat surface to the compensation surface. In these embodiments, the seat surface therefore forms a kind of sleeve, into which the compensation surface can be pushed or introduced to form a form fit between the seat surface and compensation surface. In the context of the aforementioned form fit, provision is advantageously made also for the seat surface to be, in part or in its entirety, in the form of a cylinder shell or of otherwise rotationally symmetrical shaping. The seat surface advantageously has an axis of symmetry which is coaxial with the axis of symmetry or axis of workpiece rotation of the workpiece inserted into the workpiece support. It is also possible here, of course, for the arrangement to be the other way round. Therefore, the compensation surface could also encase a cavity, into which the seat surface can then be introduced for form-fitting connection.

In the case of preferred embodiments, provision may be made for one of the workpiece-support parts to have a fastening device for fastening the workpiece support on a driveshaft of a machine tool, said driveshaft being rotatable about the drive rotation axis. This workpiece-support part may have, for example, the compensation region with the material overhang. The other workpiece-support part, or another of the workpiece-support parts, may have a workpiece adapter for fastening the workpiece on the workpiece support. For example the seat surface may then be formed on said other workpiece-support part, or other ones of the workpiece-support parts. It is also possible, of course, for the arrangement to be the other way round. For example, the seat surface may also be located on the workpiece-support part, which has the fastening device for fastening the workpiece support on the driveshaft of the machine tool. The same then applies likewise to the compensation region and the other one of the workpiece-support parts.

In order to be able to adjust the position of the workpiece as precisely as possible in the longitudinal direction of the drive rotation axis during machining, preferred embodiments of the invention make provision for at least one of the workpiece-support parts to have formed on it a longitudinal stop with a material overhang so that the longitudinal stop can be shortened by way of material removal. By machining and removing at least a part of the material overhang, the longitudinal stop can be adjusted very precisely so that a workpiece which is later held on the workpiece support during the machining has very exact positioning along the drive rotation axis.

If components which do not have a rotationally symmetric configuration are intended to be made out of the workpiece held at some point later on the workpiece support, preferred embodiments of the invention make provision for at least one of the workpiece-support parts to have formed on it a skewing-prevention component with a material overhang for the machining of the skewing-prevention component by way of material removal. This skewing-prevention component and the machining thereof make it possible for the workpiece support also to be formed in respect of an angular position precisely about the drive rotation axis such that there is no angular deviation of the workpiece and the latter is not machined with skewing about the drive rotation axis. The skewing-prevention component provided on the workpiece-support part may be, for example, a notch with a corresponding material overhang. Of course, it is nevertheless just as good for a projecting component to form the skewing-prevention component with a corresponding material overhang.

Such skewing-prevention means may be provided, for example, when a so-called connection geometry is already present, or has already been made, on the workpiece. This connection geometry may be designed, for example, such that it can be inserted into another component, e.g. an implant for insertion into the jaw, only in a single position, and therefore the artificial tooth, which is fastened on the implant by means of the component which is to be made from the workpiece, can be fastened on the implant only in a single defined position. Such connection geometries may be, for example, irregular polygonal components or the like.

A minimal variant of the invention provides a two-part workpiece support. In this minimal variant, one of the workpiece-support parts has the compensation region. The other of the workpiece-support parts has the seat surface.

The workpiece-support parts are usually produced from a very strong material, e.g. steel or the like. In these cases, the machining of the compensation region for the introduction of the compensation surface may be a laborious task. It is for example for this reason that variants according to the invention with more than two workpiece-support parts are also of interest. Provision may thus be made, for example, for the workpiece support to have at least three workpiece-support parts, wherein the compensation region and/or the longitudinal stop, which may be present, and/or the skewing-prevention component, which may be present, are/is formed on a central workpiece-support part, which is arranged, or is to be arranged, between two of the other workpiece-support parts. The central workpiece-support part may then be produced, for example, from a relatively soft material or metal, e.g. aluminum, in order to reduce the outlay for the task of introducing the compensation surface. The same applies to the longitudinal stop, which may be present, and/or to the skewing-prevention component, which may be present.

As has already been pointed out in the introduction, workpiece supports according to the invention are provided predominantly for the machining of a dental workpiece. Of course, this does not rule out the possibility of other, non-dental workpieces also being machined using workpiece supports according to the invention. A dental workpiece is generally to be understood as being a workpiece from which a denture, part of a denture or an auxiliary means for producing or fastening a denture is made. The term denture here covers both partial and full prostheses. Furthermore, for example also crowns, bridges, abutments and the like are covered by the term denture. Prior to, or at the beginning of, the machining of the dental workpiece, the dental workpiece is a blank. At the end of the machining, the dental workpiece has become the dental component, and is then inserted, possibly with yet further post-treatment, in the patient's mouth. During the machining of the dental workpiece, the latter is retained on the workpiece support. It is preferably the case that, during the machining of the workpiece, the workpiece is rotated together with the workpiece support permanently about the drive rotation axis. It is, however, also possible to rotate the workpiece together with the workpiece support about the drive rotation axis, during the machining of the workpiece, only temporarily, intermittently or as required. The tool used for machining purposes may have, for example, a milling head or a grinding head. The tool may be rotated, in addition, about a dedicated axis during the machining. The dental workpieces which are to be machined may have, or consist of, different kinds of metals, e.g. also titanium. Of course, it is also possible for workpiece supports according to the invention to be used for the machining of dental workpieces made of different materials, e.g. ceramic material or plastics material. The workpiece-support parts are preferably produced from suitable metals.

As already explained in the introduction, in addition to a workpiece support according to the invention, the invention also relates to a method for correcting the axial position of a workpiece support. In the correction of the axial position, the task is, in particular, to eliminate an offset between the drive rotation axis of a machine tool and the axis of symmetry or axis of workpiece rotation of the workpiece which is to be machined, or to avoid said offset from the outset. For this purpose, in the case of a method of correcting the axial position of a workpiece support according to the invention, provision is made for the workpiece-support part with the compensation region to be fastened on a driveshaft of a machine tool, said driveshaft being rotatable about the drive rotation axis, and then, by means of material removal along with simultaneous rotation of the driveshaft together with the workpiece-support part about the drive rotation axis, for the compensation surface to be formed in the compensation region by way of a material-removing tool of the machine tool.

As already explained in the introduction, provision is advantageously made here for the compensation surface to be, in part or in its entirety, in the form of a cylinder shell or of otherwise rotationally symmetrical shaping, wherein an axis of symmetry of the cylinder-shell or otherwise rotationally symmetrical shape of the compensation surface is coaxial with the drive rotation axis. If surface regions which differ from the cylinder-shell or otherwise rotationally symmetrical shape should be provided in the compensation region, then provision is advantageously made, at any rate, for these surface regions which may be present in the compensation region and differ from the cylinder-shell or otherwise rotationally symmetrical shape to be located closer to the axis of symmetry than the cylinder-shell or otherwise rotationally symmetrical shape of the compensation surface. The method of correcting the axial position of the workpiece support is implemented preferably in the same machine tool as the subsequent machining of a workpiece retained on said workpiece support. In this sense, provision is therefore advantageously made for the workpiece support for machining of the dental workpiece to be fastened on a driveshaft of a machine tool, said driveshaft being rotatable about the drive rotation axis, in the same way, and on the same driveshaft, as the workpiece-support part with the compensation region was fastened in order for the compensation surface to be formed in the compensation region.

BRIEF DESCRIPTION OF THE DRAWINGS

Further features and details of preferred embodiments of the invention will be outlined hereinbelow with reference to two exemplary embodiments according to the invention. In the drawings.

DETAILED DESCRIPTION

Figure 1:
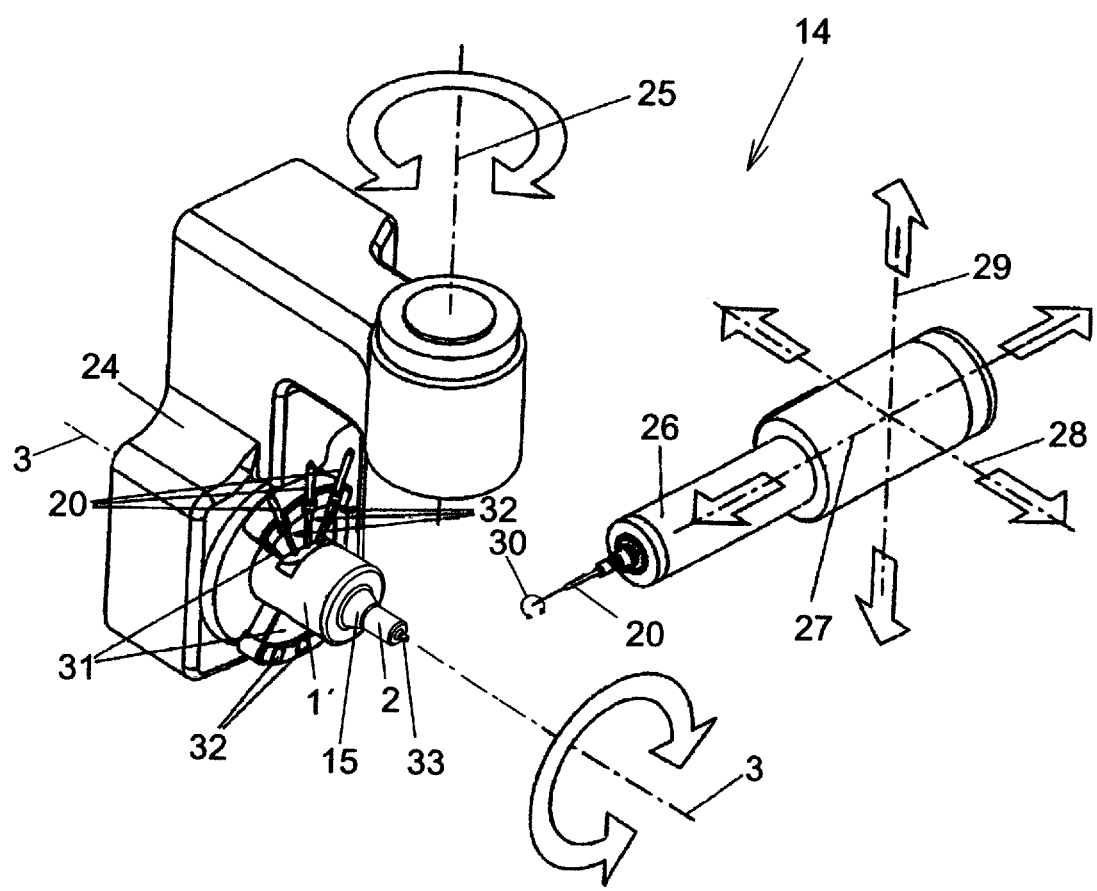
FIGS. 1 and 2 show illustrations relating to the prior art and to the problem addressed by the invention.

Machine tools 14 in which workpiece supports according to the invention can be used and machined in order for the axial position to be corrected may be formed in a wide variety of different embodiments. To demonstrate an example of a machine tool 14 which is suitable in principle, reference is made to the machine tool disclosed in WO 2013/020147 A1. FIG. 1 shows an arrangement—which, as far as the machine tool is concerned, is taken from FIG. 4 of WO 2013/020147 A1—of machine-tool components required for the invention. However, FIG. 1 illustrates a straightforward workpiece support 1' which, although allowing rotary machining of the workpiece 2 in principle, is not yet designed according to the invention. In rotary machining, the workpiece support 1' is rotated together with the workpiece 2 about the drive rotation axis 3 preferably on a permanent basis. The workpiece 2 is machined using the tool 20 during this rotary movement about the drive rotation axis 3. The tool 20 may be, or have, for example a milling or grinding head. Drills or drill heads are also conceivable. The tool 20 is retained in the tool-support head 26 and can be moved thereby in three mutually orthogonal directions 27, 28 and 29 relative to the workpiece 2 or workpiece support 1. It would be conceivable, in principle, for the rotary movement of the workpiece 2 about the drive rotation axis 3 to be sufficient for material to be removed from the workpiece 2. In preferred embodiments, however, provision is made for the tool 20 to be rotated, by a corresponding drive in the tool-support head 26, in one of the directions of tool rotation 30 during the machining of the workpiece 2. This is nevertheless, as has been said, optional. During the rotary machining, that is to say the rotation of the workpiece 2 together with the workpiece support 1' about the drive rotation axis 3 and the simultaneous machining of the workpiece 2, the latter is fastened on the workpiece support 1' by the workpiece adapter 15. The workpiece support 1', in turn, has a fastening device 12 (not visible in FIG. 1) for fastening on the driveshaft 13 (not visible either) of the supporting arm 24. By means of the driveshaft 13, the workpiece support 1' and the workpiece 2 at any rate are rotated about the drive rotation axis 3. In FIG. 1, a tool holder 31 with various tool mounts 32 is located on the workpiece support 1'. This is, of course, optional. The single-piece design which is also realized here for the workpiece holder 31 and workpiece support 1' is known per se from WO 2013/020147 A1 and need not be explained in any more detail here. In all the variants shown here, however, the tool holder 31 could just as easily be left out. In FIG. 1 and also in the exemplary embodiments according to the invention explained hereinbelow, the supporting arm 24 can be pivoted as a whole, and thus also together with the workpiece support 1 and the workpiece 2, about a vertical axis 25. This is advantageous for making undercuts in the workpiece 2. This ability of the supporting arm 24 to pivot about the vertical axis 25, and frankly its ability to move at all, is nevertheless optional. It is also possible to have exemplary embodiments of the invention in which the supporting arm 24 and thus also the driveshaft 13 are arranged in a fixed position. This does not mean, of course, that the driveshaft 13 is no longer rotatable about the drive rotation axis 3.

The rest of the components of the machine tool 14 (which are not illustrated here) may be designed for the invention as in the prior art and as disclosed, for example, in WO 2013/020147 A1.

In the exemplary embodiment shown, the not yet machined workpiece 2 already has a connection geometry 33 for fastening on an implant 45. However, this is not imperative; it is also possible for a corresponding connection geometry 33, if required, to be made in the workpiece 2 during the machining of the latter.

Figure 2:
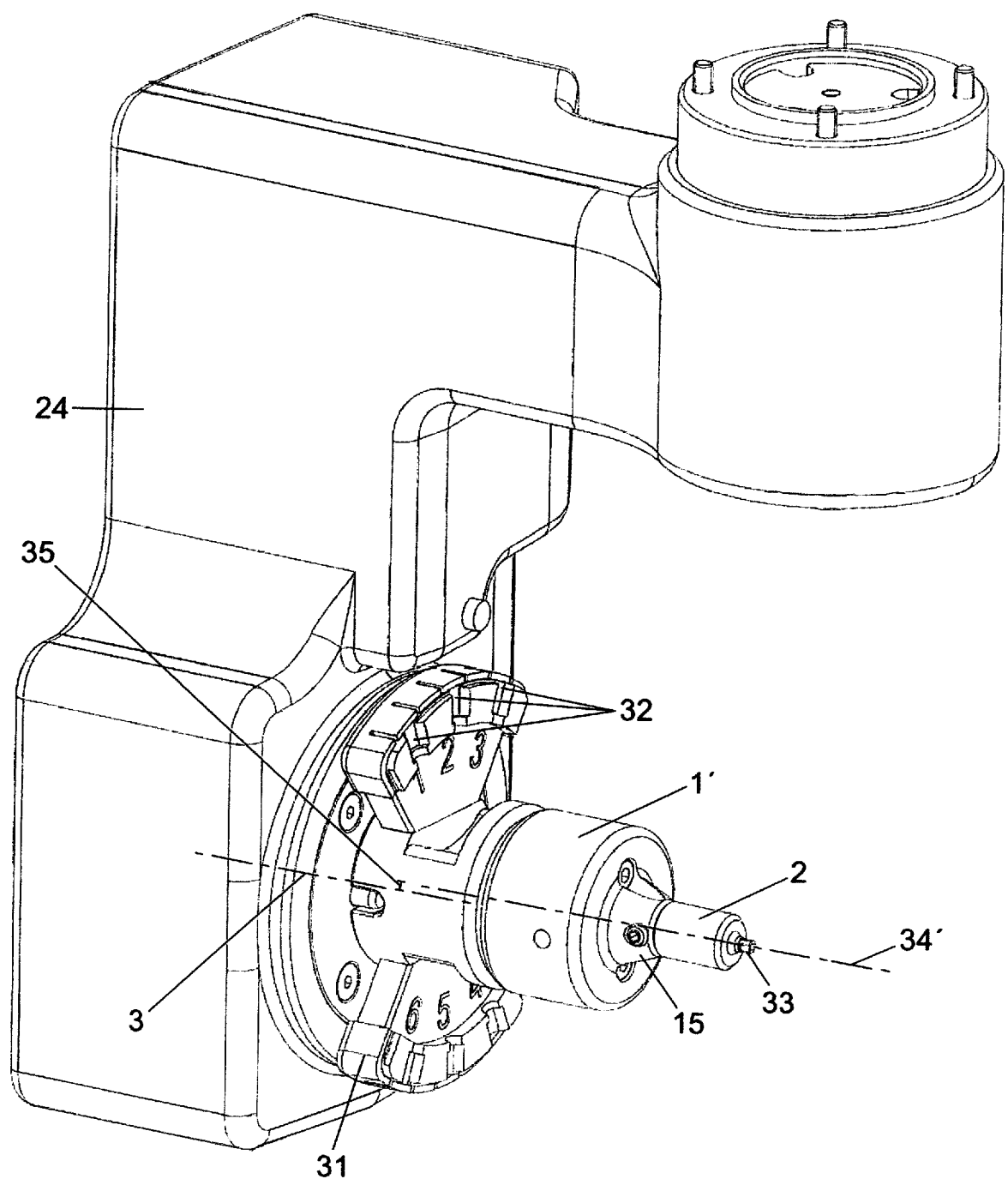

FIG. 2, then, shows the problem addressed by the invention with reference to the workpiece support 1' illustrated here. This problem resides in the fact that inaccuracies in the production of the workpiece support 1' or deviations in the position of the driveshaft 13 may result, in various machine tools 14 or the driveshaft 13 thereof, in the axis of workpiece rotation 34', that is to say the axis of symmetry of the workpiece 2, which is inserted into the workpiece adapter 15, not being precisely coaxial with the drive rotation axis 3, about which the workpiece support 1' is rotated together with the workpiece 2. This is demonstrated in FIG. 2 by the offset 35 between the drive rotation axis 3 and the axis of workpiece rotation 34'. This error in the axial position has to be corrected in order to ensure as precise rotary machining of the workpiece 2 as possible. In order to solve this problem, provision is made, in the case of the workpiece support 1 according to the invention, for the workpiece support 1 to have at least two workpiece-support parts 4, 5, 6, which can be separated from one another and connected to one another, wherein one of the workpiece-support parts 4, 5 has at least one compensation region 7 with a material overhang 8 for introduction of a compensation surface 9 by way of material removal, and the other one of the workpiece-support parts 6 has a seat surface 10 for form-fitting connection to the compensation surface 9.

Figure 3:
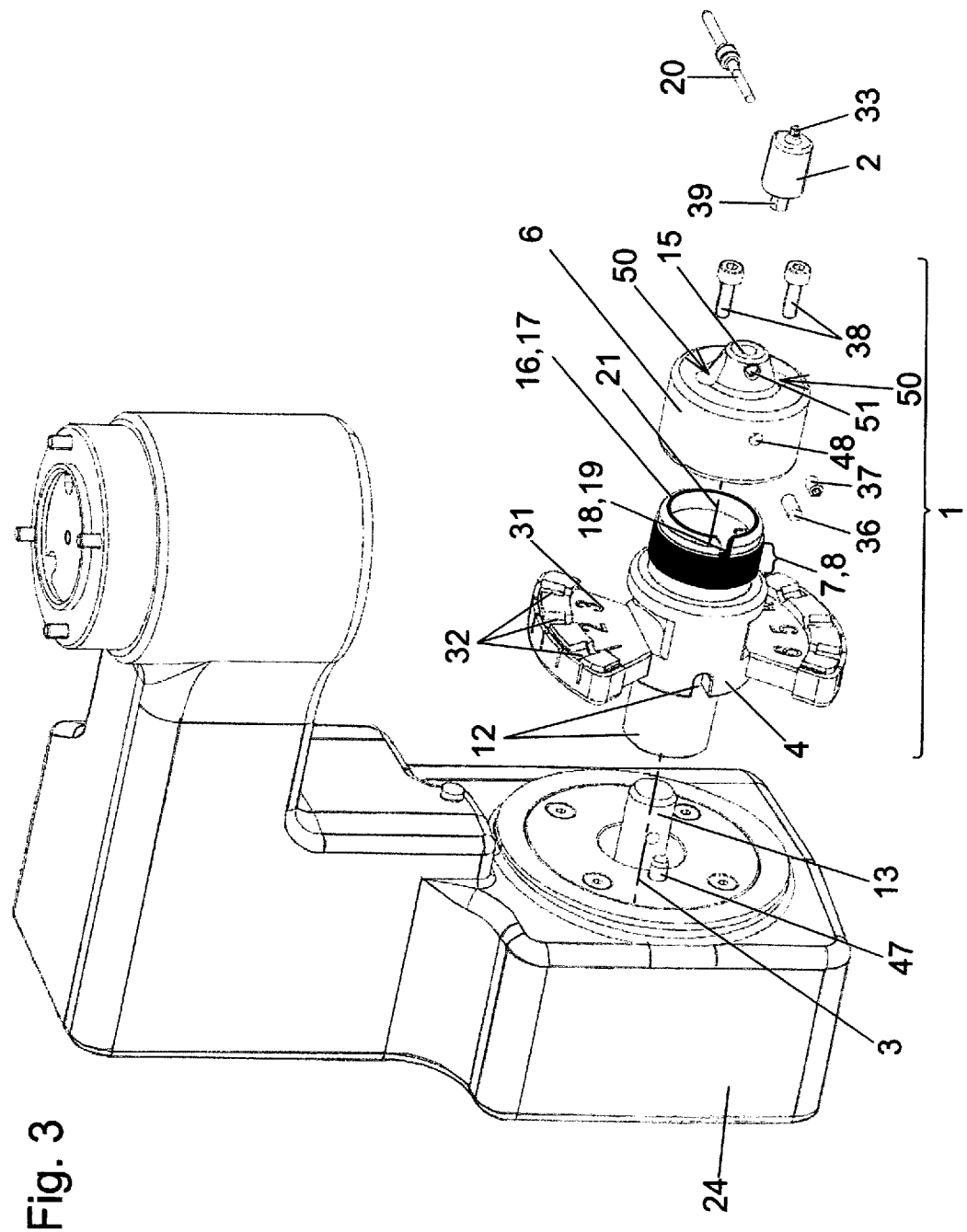
FIGS. 3 to 6 show illustrations relating to a first exemplary embodiment of a workpiece support according to the invention.
Figure 4:
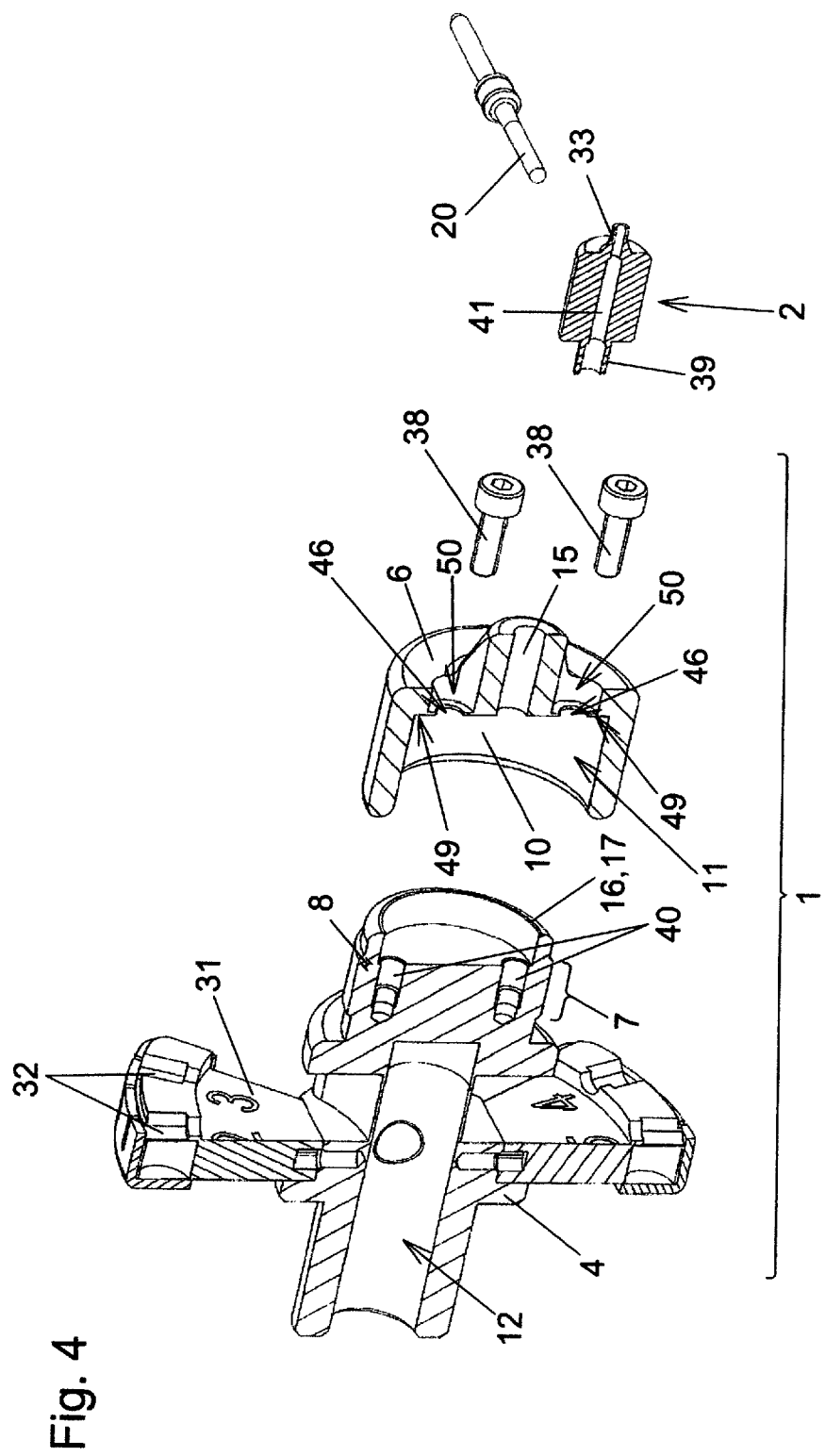
Figure 5:
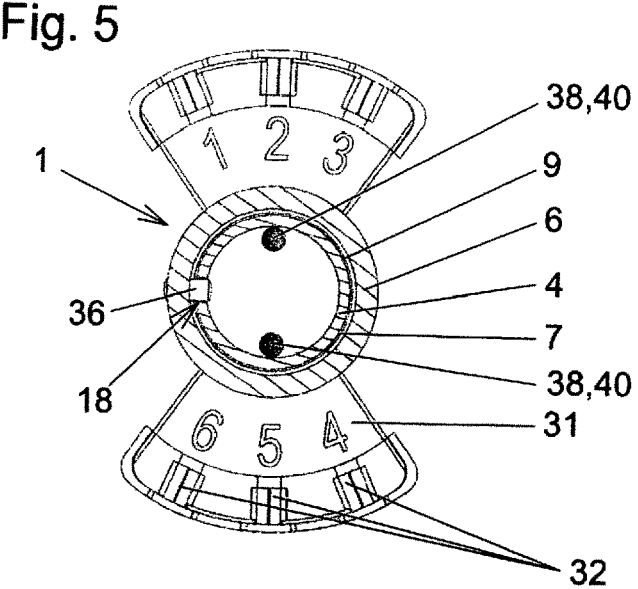
Figure 6:
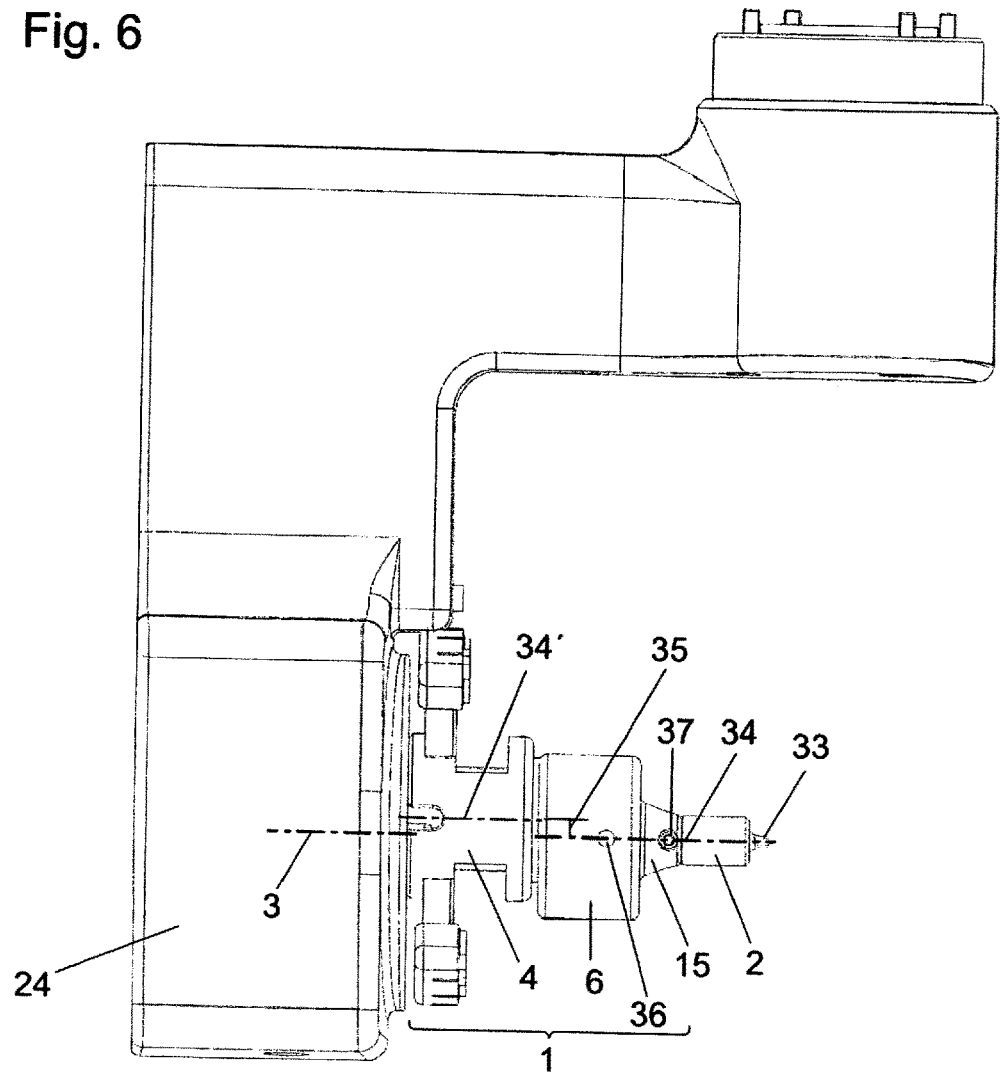

A first embodiment of a workpiece support 1 according to the invention, which is formed from two workpiece-support parts 4 and 6, is illustrated in FIGS. 3 to 6. FIG. 3 shows an exploded illustration, in perspective, of the supporting arm 24, the workpiece-support parts 4 and 6, the workpiece 2 and the tool 20. Likewise in an exploded illustration, but this time in a longitudinal section, FIG. 4 shows, once again, the workpiece-support parts 4 and 6 and also the workpiece 2 and the tool 20. FIG. 5 shows a section, taken along a section plane in a direction normal to the drive rotation axis 3, in the region of the skewing-prevention component 18. FIG. 6 shows the workpiece support 1 in the assembled state following correction of the axial position by a method according to the invention.

In this first exemplary embodiment, the workpiece support 1 according to the invention has the two workpiece-support components 4 and 6. The workpiece-support part 4 has the fastening device 12, by which the workpiece support 1 is fastened on the driveshaft 13. The driveshaft 13 is rotated about the drive rotation axis 3 by a rotary drive (not visible here) arranged in the supporting arm 24. The pin 47 engages in a corresponding accommodating recess of the fastening device 12, and, therefore, when the fastening device 12 is arranged definitively in position, the workpiece-support part 4 is rotated with the driveshaft 13 about the drive rotation axis 3. Of course, there are numerous alternative possibilities for forming a fastening device 12 for connecting the workpiece-support part 4 and driveshaft 13 in a rotationally fixed manner.

In the first exemplary embodiment shown, the workpiece-support part 4, however, also has the compensation region 7 with the material overhang 8 for introduction of the compensation surface 9 by way of material removal. It is additionally the case in this exemplary embodiment that the workpiece-support part 4 also has formed on it the longitudinal stop 16 with the material overhang 17 and also the skewing-prevention component 18, here in the form of a notch, with the material overhang 19.

As can be seen to good effect in particular in FIG. 4, the workpiece-support part 6 of this exemplary embodiment, in addition to the workpiece adapter 15, also has the seat surface 10. The latter encases the cavity 11, into which the compensation region 7 can be introduced, once the compensation surface 9 has been formed, in order to establish the form-fitting connection between the seat surface 10 and compensation surface 9. As already explained in the introduction, the seat surface 10 is preferably, in part or in its entirety, in the form of a cylinder shell or of otherwise rotationally symmetrical shaping.

The workpiece 2 is inserted into the workpiece adapter 15 by way of its support adapter 39. The support adapter 39 and/or the workpiece adapter 15 are/is designed preferably such that this insertion can take place only in a single angular position or position of rotation relative to one another about the axis of workpiece rotation 34. In the exemplary embodiment shown, the support adapter 39 has a non-round outer contour, which is flattened in a lateral region and can be fastened exclusively in a defined position in the workpiece adapter 15 by the allen screw 37 and of the threaded bore 51 provided therefor. Here too, there are, of course, numerous alternative possibilities for fastening the workpiece 2 on the workpiece adapter 15.

As already explained, the compensation region 7, in this exemplary embodiment, is formed on the workpiece-support part 4, which also has the fastening device 12 for fastening a driveshaft 13. The compensation surface 9 can be made in said compensation region 7 by the tool 20, by virtue of the material overhang 8 being removed appropriately. The compensation surface 9 here is preferably, at least in part, in the form of a cylinder shell or of otherwise rotationally symmetrical shaping, to be precise advantageously such that the axis of symmetry 21 of the shape 22 of the compensation surface 9 which is to be produced is coaxial to the drive rotation axis 3, or is located coaxially thereon. Using the method of correcting the axial position according to the invention, provision is made here for the workpiece-support part 4 of this exemplary embodiment, with the compensation region 7, to be fastened on the driveshaft 13 of the machine tool 14, said driveshaft being rotatable about the drive axis 3, and then, by material removal along with simultaneous rotation of the driveshaft 13 together with the workpiece-support part 4 about the drive rotation axis 3, for the compensation surface 9 to be formed in the compensation region 7 by way of the material-removing tool 20 of the machine tool 14. For this purpose, the workpiece-support part 4 of the first exemplary embodiment is fastened on the driveshaft 13 by the fastening device 12 in the same way as the workpiece support 1 as a whole is secured on the driveshaft 13 during subsequent machining of the workpiece 2. This is shown, by way of example, in FIG. 12 for the second exemplary embodiment and is likewise implemented for the first exemplary embodiment.

Since the compensation surface 9 usually, in relation to the workpiece-support part 4 itself, has to be formed approximately eccentrically in the workpiece-support part 4, the material overhang 8 in the compensation region 7 is usually of such dimensioning, prior to the machining, that the diameter of the compensation region 7 is larger than the internal diameter of the seat surface 10, and therefore, prior to the compensation surface 9 being made, the compensation region 7 usually does not fit into the cavity 11 of the workpiece-support part 6. Form-fitting introduction of the compensation region 7 into the cavity 11, which is enclosed by the seat surface 10, is possible usually only after the compensation surface 9 has been formed. While the compensation surface 9 is being formed, the supporting arm 24 is advantageously secured in its position, that is to say in particular it is not pivoted about the vertical axis 25. Particularly preferred embodiments of the invention make provision, in the two exemplary embodiments of the invention shown here, but also in others, for the tool 20, for forming the compensation surface 9, to be moved along the compensation region 7 exclusively in the directions 28, that is to say parallel to the drive rotation axis 3, while the workpiece-support part 4 rotates about the drive rotation axis 3. As a result, a compensation surface 9 in the form of a cylinder shell is formed according to the invention in the compensation region 7, wherein the axis of symmetry 21 of said shape 22 of the cylinder shell of the compensation surface 9 is precisely coaxial with the drive rotation axis 3.

In other embodiments, it is also possible for the tool 20, in addition, to be moved toward the drive rotation axis 3, or away from the same, in one of the directions 27, while material is being removed in order to produce the compensation surface 9. As a result, the compensation surface 9 is then, for example, conical. However, even in the case of said other rotationally symmetrical shapes 22 of said compensation surface 9, the result is that the axis of symmetry 21 of said shape 22 is precisely coaxial with the drive rotation axis 3.

In order to be able to position the workpiece 2 precisely as it is being machined in the longitudinal direction of the drive rotation axis 3, preferred exemplary embodiments of the invention, as shown here, also provide a longitudinal stop 16 with a material overhang 17, wherein the material overhang 17 can have material removed, if necessary, by use of the tool 20 in order for the longitudinal stop 16 to be positioned precisely. The relative position between the workpiece-support parts 4 and 6 along the drive rotation axis 3 can be adjusted precisely by means of the appropriate precise machining of the longitudinal stop 16. For the machining of the longitudinal stop 16 or the material overhang 17 thereof, the workpiece-support part 4 of the first exemplary embodiment is fastened appropriately on the driveshaft 13 again and machined by means of the tool 20, as is shown exclusively in an analogous manner for the second exemplary embodiment in FIG. 13.

If necessary, it is also possible to provide a skewing-prevention means between the workpiece-support parts 4 and 6. For this skewing-prevention means in the workpiece-support part 4, the first exemplary embodiment shown here provides a skewing-prevention component 18 in the form of a slot with a material overhang 19. It is also possible for this material overhang 19 to be machined by the tool 20 such that the workpiece-support parts 4 and 6 can be connected to one another in a single angular position relative to one another, that is to say not skewed in relation to one another about the drive rotation axis 3. For this purpose, the exemplary embodiment shown provides an index pin 36, which is introduced, through the appropriate index opening 48 in the workpiece-support part 6, into the definitively formed skewing-prevention component 18 and thus, as can be seen to particularly good effect in FIG. 5, ensures that the workpiece-support parts 4 and 6 are fastened on one another only in a single angular position, and not skewed relative to one another about the drive rotation axis 3. For the sake of completeness, it should be pointed out that it is, of course, not imperative for the skewing-prevention component 18 to be designed in the form of a slot with a corresponding material overhang 19. The skewing-prevention component 18 with corresponding material overhang 19 could, for example, also be a protrusion or some other suitable geometrical configuration.

Following production according to the invention of the compensation surface 9 by way of material being removed from the material overhang 8 in the compensation region 7, and possibly following appropriate machining of the longitudinal stop 16 and of the skewing-prevention component 18, the workpiece-support parts 4 and 6 can be joined together in a form-fitting manner and in a defined position. The result here is a form fit between the compensation surface 9 and seat surface 10, and, if present, also a form fit between the longitudinal stop 16 and corresponding mating stop 49 on the workpiece-support part 6. It may also be possible for the index pin 36 to engage in a form-fitting manner in the appropriately machined skewing-prevention component 18. In order to connect the two workpiece-support parts 4 and 6 to one another, the exemplary embodiment shown also provides screws 38, which are guided through through-passage openings 46 in the workpiece-support part 6 and are screwed into the screw holes 40 in the workpiece-support part 4. The screws 38 and the screw-head apertures 50 accommodating them are designed such that the screws 38 exert exclusively a tensile stress in the direction of the drive rotation axis 3. The orientation of the two workpiece-support parts 4 and 6 on one another takes place exclusively via the form fit between the compensation surface 9 and the seat surface 10 and, if present, via the longitudinal stop 16 and/or the skewing-prevention component 18.

FIG. 6, then, shows the workpiece support 1 according to the invention which is the result of the axial position being corrected and in which the workpiece-support parts 4 and 6 are joined together and the workpiece 2 which is to be machined is fastened in the workpiece adapter 15. The workpiece support 1 and the workpiece 2, in FIG. 6, are fastened on the driveshaft 13. This is the position in which the workpiece 2 can then be machined by means of the tool 20. FIG. 6 depicts the drive rotation axis 3 and the axis of workpiece rotation 34 in the position they assume once the axial position has been corrected. The axis of workpiece rotation 34 is now, as desired, coaxial with the drive rotation axis 3, or is located coaxially thereon. Also depicted are the axis of workpiece rotation 34' in its position according to FIG. 2, that is to say prior to the axial position being corrected, and the now corrected offset 35. This correction of the axial position and/or of the offset 35 can also be seen externally by way of the slightly eccentric, in this case vertically displaced position between the workpiece-support part 4 and workpiece-support part 6. The now precisely coaxial orientation of the axis of symmetry of the workpiece 2, that is to say of the axis of workpiece rotation 34, in relation to the drive rotation axis 3, then allows the workpiece 2 to be subjected very precisely to rotary machining.

Figure 7:
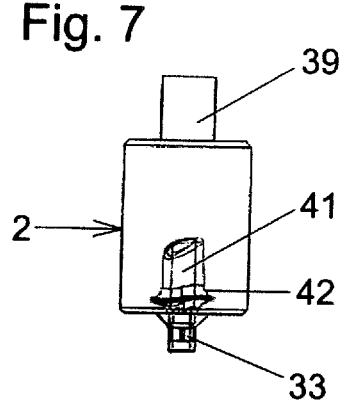
FIGS. 7 to 9 show an example of a component which is to be made from the dental workpiece, and the use thereof.
Figure 8:
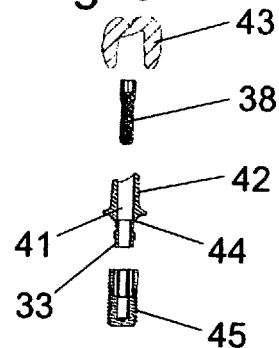
Figure 9:
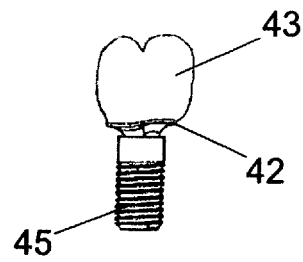
Figure 10:
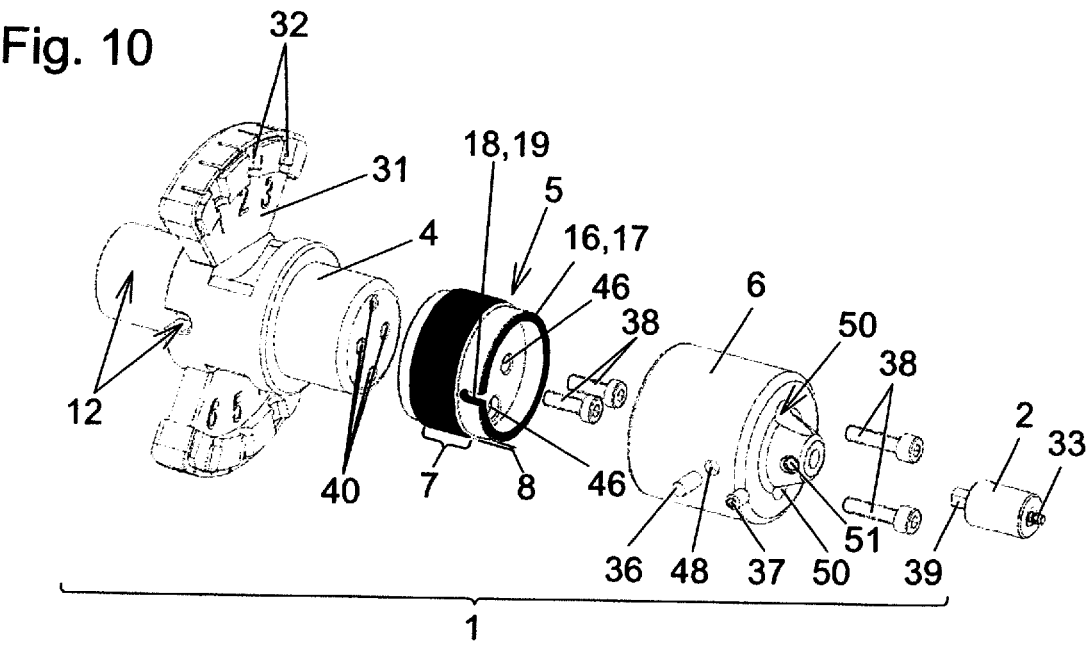
FIGS. 10 to 15 show illustrations relating to a second exemplary embodiment of a workpiece support according to the invention.
Figure 11:
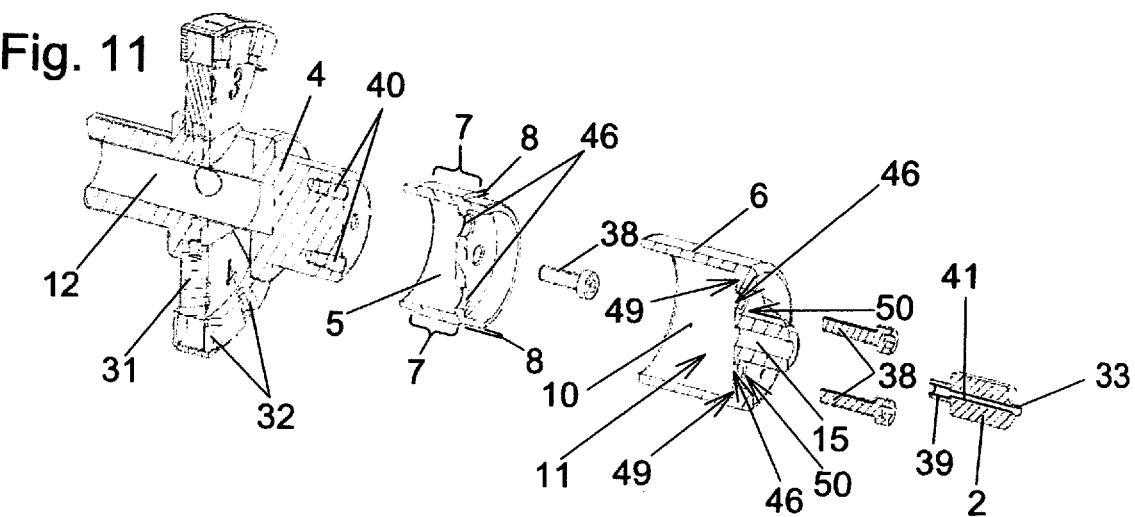

FIGS. 7 to 9 show, by way of example, a component which can be made from the workpiece 2. The component in this case is an abutment 42. The latter is pushed into an implant 45 by way of the connection geometry 33. The implant 45, as is known per se, is implanted, or is to be implanted, in the patient's jawbone. The external shape of the connection geometry 33, in preferred embodiments, ensures that there is no skewed installation or skewing of the abutment 42, which is produced from the workpiece 2, as it is being fastened in the implant 45. In addition, the abutment 42 is screwed firmly in the implant 45 by means of the screw 38. For this purpose, use is made of the longitudinal channel 41, which in the present exemplary embodiment is already present in the non-machined workpiece 2 or blank. This can also be gathered from FIG. 4 relating to the first exemplary embodiment and FIG. 11 relating to the second exemplary embodiment. The shoulder 44 in the longitudinal channel 41 serves as a rest for the head of the screw 38. A crown 43 can be positioned on the abutment 42 thus fastened on the implant 45. FIG. 9 shows the crown 43, the abutment 42 and the implant 45 in the assembled state. In FIG. 7, the not yet machined blank, that is to say the original workpiece 2, is illustrated as being visible, and it is therefore possible to see the abutment 42 which is to be made by way of material removal. For the sake of completeness, it should be pointed out that the longitudinal channel 41 is optional and the abutment 42, as is the case here, can be designed in the form of a crown support, but also in the form of the crown itself. If it is a crown, then the longitudinal channel 41 can be closed by filling material which is known per se.

FIGS. 10 to 15 show a second exemplary embodiment of a workpiece support according to the invention and also illustrations relating to the correction of the axial position according to the invention. In said second exemplary embodiment, the workpiece support 1 has three workpiece-support parts 4, 5 and 6, as can be seen to good effect in the exploded illustrations according to FIGS. 10 and 11. Both the compensation region 7 with the material overhang 8 and the longitudinal stop 16 with the material overhang 17 and also the skewing-prevention component 18 with the material overhang 19 are formed here on the central workpiece-support part 5, which is arranged between the two other workpiece-support parts 4 and 6. This has the advantage that said central workpiece-support part 5 may be formed from a relatively soft material, which simplifies the task of removing material from the material overhangs 8, 17 and 19. The workpiece-support part 6 with the cavity 11 and the seat surface 10, and also with the workpiece adapter 15 is designed as in the case of the first exemplary embodiment, and therefore reference can be made to the above description in this respect and also in respect of the question as to how the workpiece 2 is fastened on the workpiece adapter 15 and therefore on the workpiece-support part 6. As in the first exemplary embodiment, the workpiece-support part 4 has the fastening device 12 for fastening the workpiece support 1 on the driveshaft 13 and also has the tool holder 31, which once again is optional. Reference can be made to the description of the first exemplary embodiment in this respect as well. The central workpiece-support part 5, which in this case is of sleeve-like design, is fastened on the workpiece-support part 4 by two screws 38, which are guided through the through-passage opening 46 in the central workpiece-support part 5 and are screwed firmly into the corresponding screw holes 40 in the workpiece-support part 4. It is also the case that the task of mounting the workpiece-support part 6 on the interconnected workpiece-support parts 4 and 5 by means of the screws 38 and the corresponding screw holes 40 in the workpiece-support part 4 takes place as in the first exemplary embodiment. Here too, orientation is ensured via the interaction of the compensation surface 9, seat surface 10, longitudinal stop 16 and mating stop 49, and also the skewing-prevention component 18 and index pin 36. The screws 38 serve merely for mounting purposes in the longitudinal direction of the drive rotation axis 3.

Figure 12:
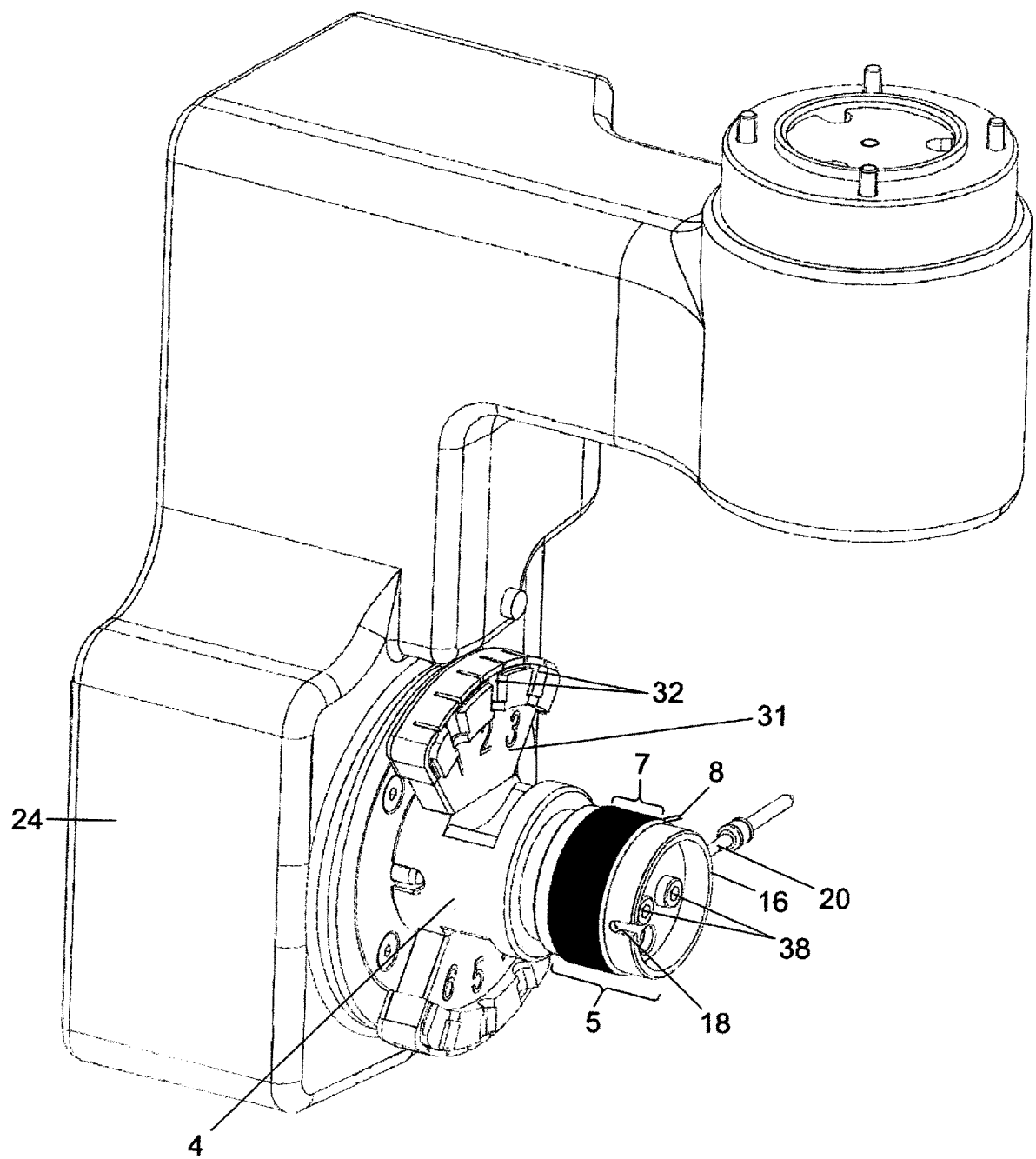
Figure 13:
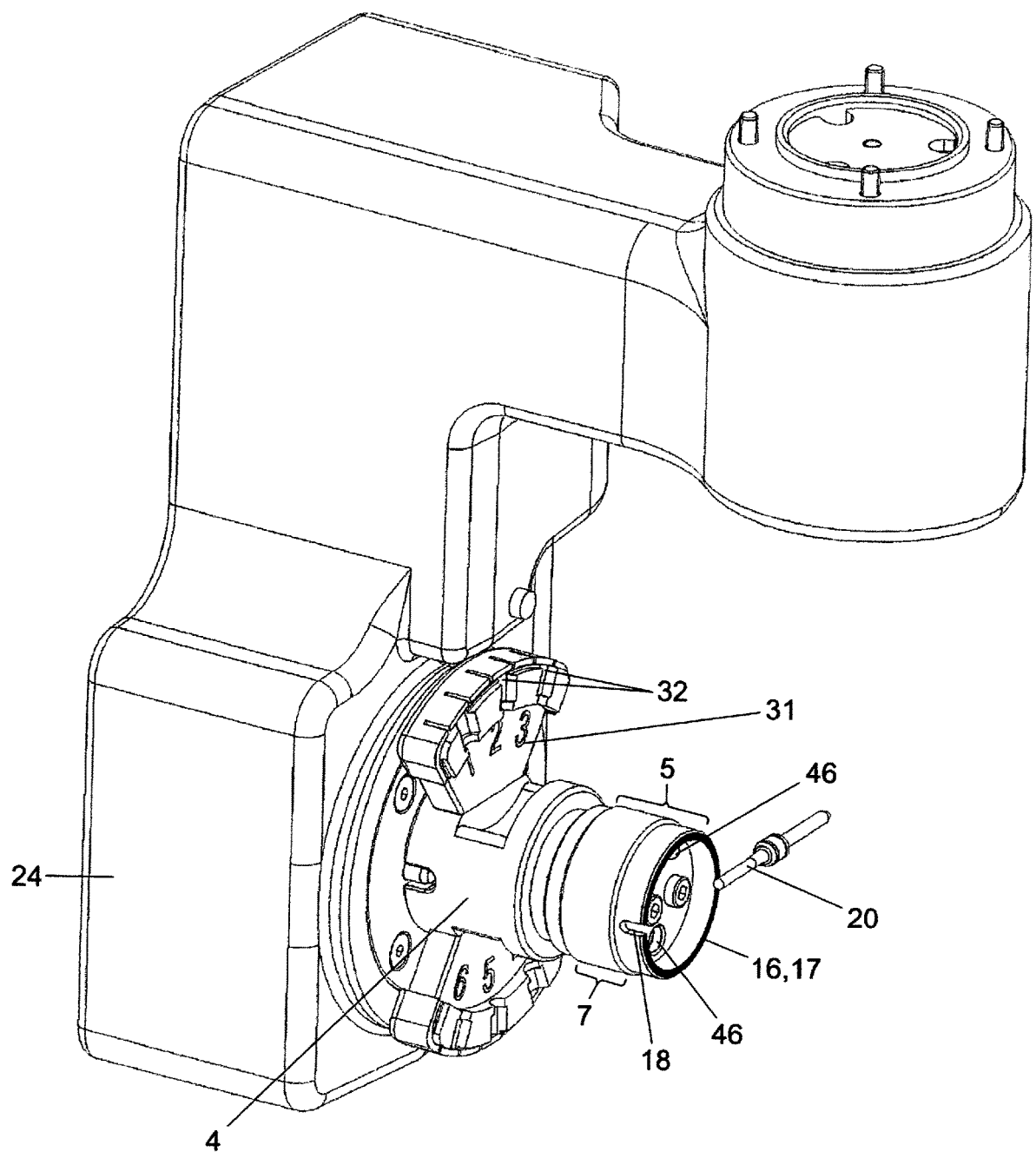
Figure 14:
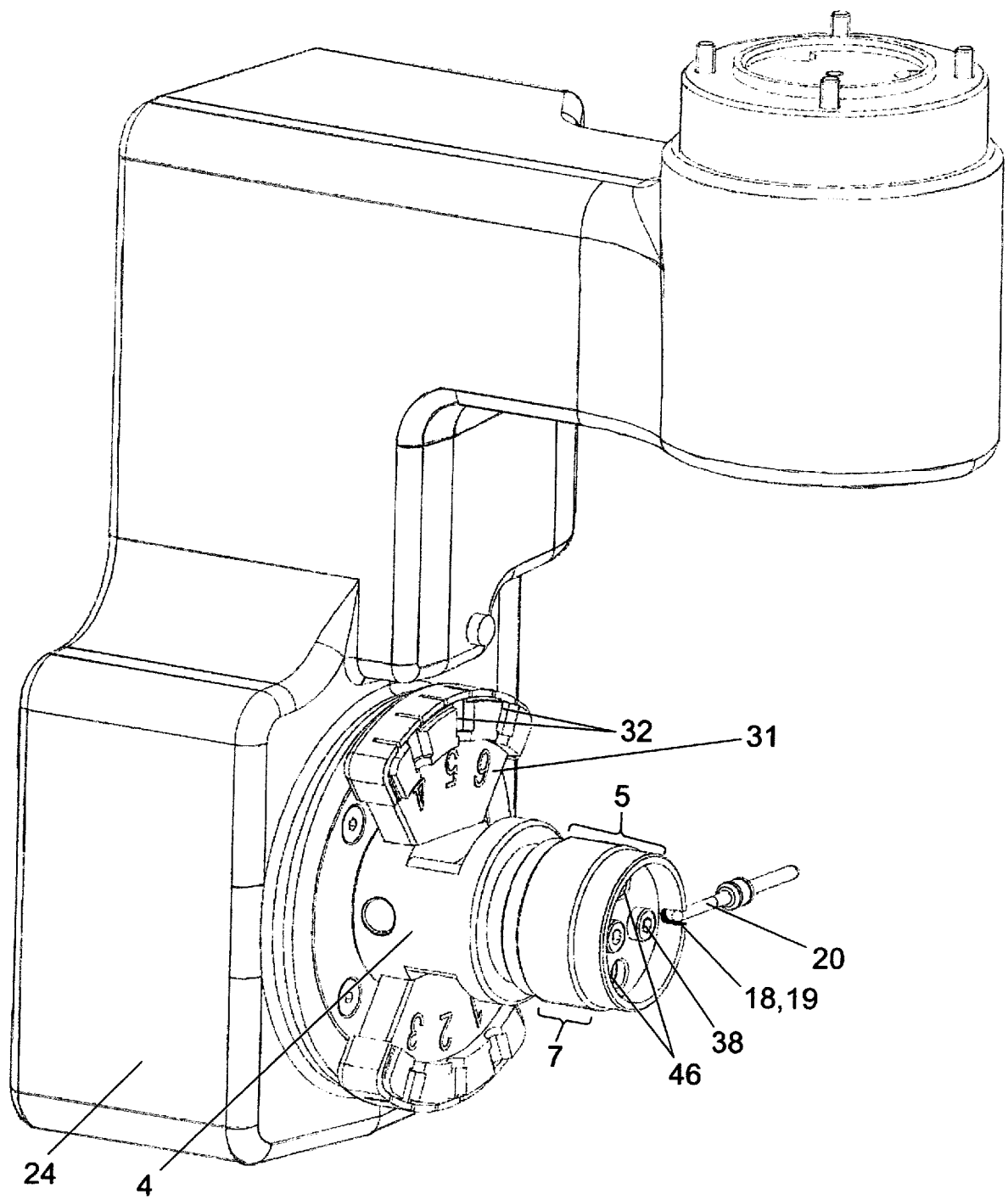

For the task of correcting the axial position according to the invention, the workpiece-support parts 4 and 5, as shown in FIG. 12, are fastened on the driveshaft 13 in the same way as they are also fastened there for the subsequent machining of the workpiece 2. However, the workpiece-support part 6 is still left out while the axial position is being corrected. The removal of material from the compensation region 7 by the tool 20 takes place as in the first exemplary embodiment and as also outlined there. A compensation surface 9 as is shown by way of example in FIG. 15, and will be explained in more detail hereinbelow, is made as a result. FIG. 13 shows the removal of material from the material overhang 17 of the longitudinal stop 16. As for the machining of the compensation region 7, for this purpose, the workpiece-support part 4 and workpiece-support part 5 are rotated together about the drive rotation axis 3, while the tool 20 is moved gradually, with simultaneous material removal, to a predetermined position along the drive rotation axis 3, that is to say in one of the directions 28. This makes it possible to adjust very precisely the length of the then assembled workpiece support 1, and thus the position of the workpiece 2 on the then assembled workpiece support 1, along the drive rotation axis 3. FIG. 14 shows the machining of the material overhang 19 on the skewing-prevention component 18, which is designed here, once again, in the form of a slot. This machining also takes place by the tool 20. This makes it possible to adjust very precisely the angular position of the workpiece part 6 about the drive rotation axis 3 and thus of the workpiece 2 relative to the driveshaft 13.

Figure 15:
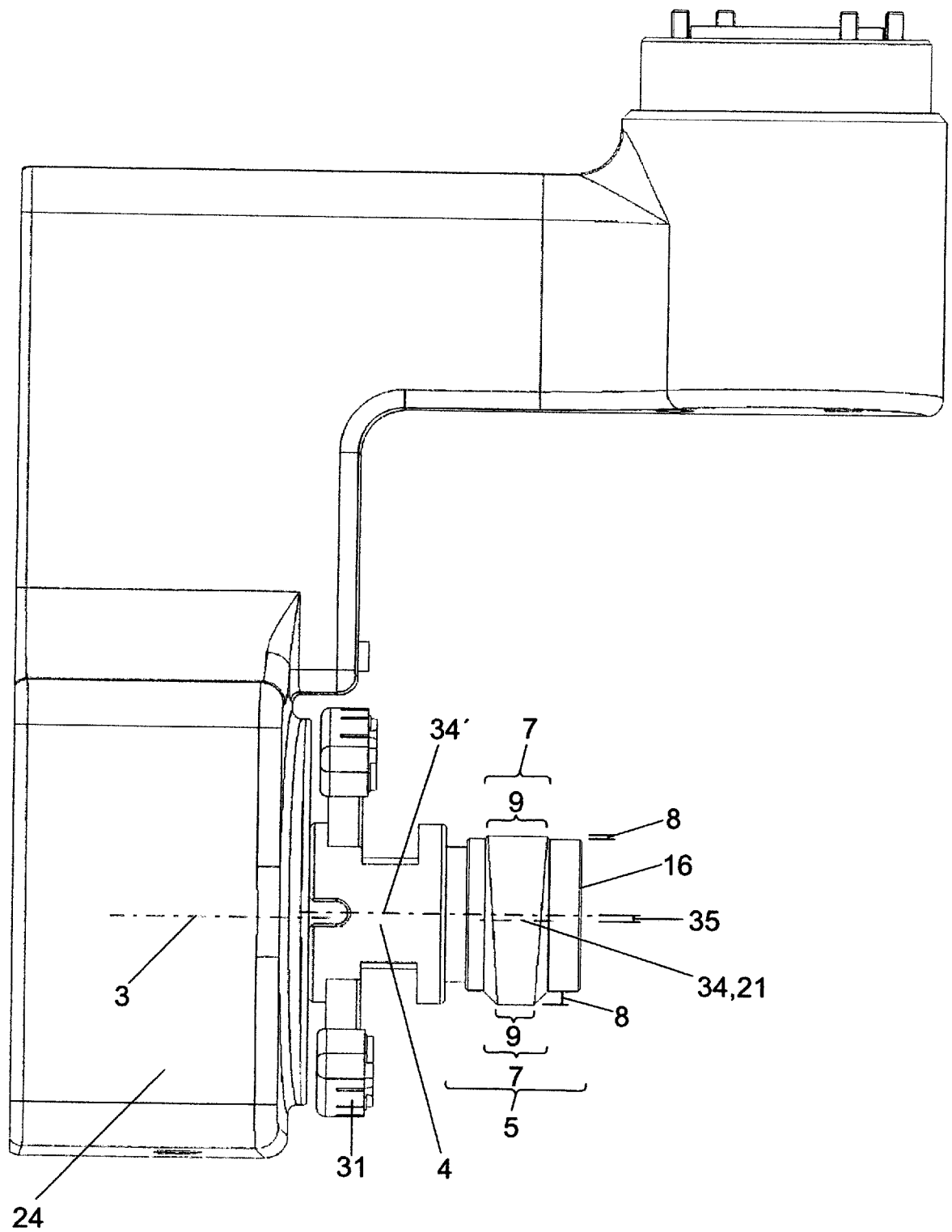

FIG. 15 shows a side view of the compensation surface 9 made by virtue of the axial position being corrected. In the position illustrated here, it can be seen to good effect that more material has been removed, in the compensation region 7, from the upper end of the workpiece-support part 5 than from the lower end of the compensation region 7. The remaining material overhang 8 is thus clearly smaller at the top than at the bottom. As a result, the axis of symmetry 21 of the shape 22 of the compensation surface 9, in this case made in the form of a cylinder shell, is precisely coaxial with the drive rotation axis 3. For comparison purposes, the figure includes, once again, the axis of workpiece rotation 34' prior to correction by means of the compensation region 7 being machined. The now eliminated offset 35 can be seen to good effect here.

Figure 16:
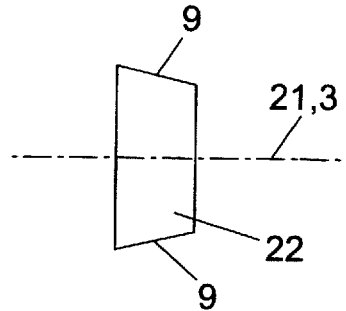
FIGS. 16 to 19 show schematic illustrations relating to various examples of how a compensation surface can be formed.

FIG. 16 shows schematically, as an example, that the shape 22 of the compensation surface 9 need not be in the form of a cylinder shell; rather, it may also be of otherwise rotationally symmetrical shaping in relation to the axis of symmetry 21 and thus, as a result, the drive rotation axis 3. In FIG. 16, the compensation surface 9 forms a truncated cone.

Figure 17:
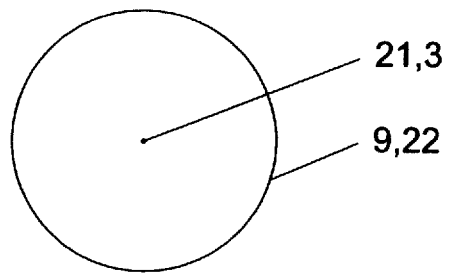
Figure 18:
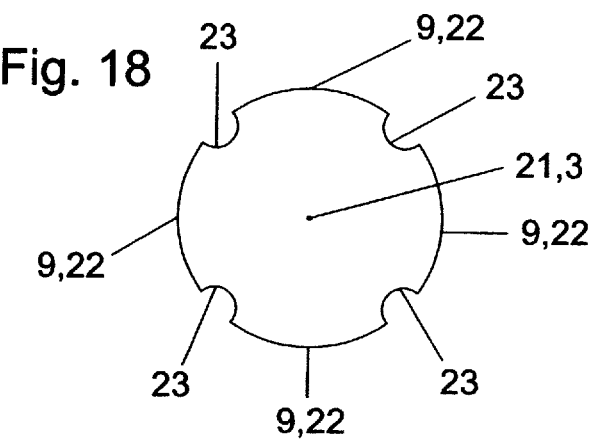
Figure 19:
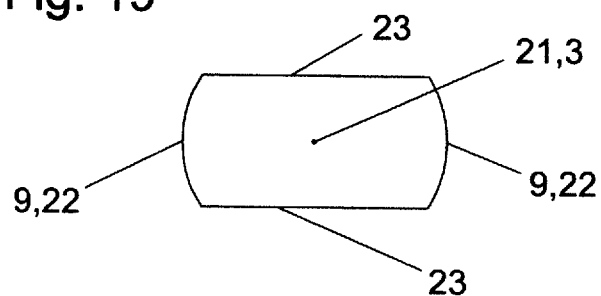

FIG. 17 shows, schematically, a section, taken along a section plane in a direction normal to the drive rotation axis 3 or axis of symmetry 21, through a compensation surface 9 made entirely in the form of a cylinder shell. In this case, along said section, the compensation surface 9 forms an exact circle with the center point of the circle on the drive rotation axis 3. As mentioned in the introduction, however, it is not imperative for the compensation surface 9 to be entirely rotationally symmetrical or in the form of a cylinder shell. FIGS. 18 and 19 show examples of this. Each illustrates, in turn, a section which is taken through a completed compensation surface 9 along a section plane which is normal to the drive rotation axis 3. Both variants according to FIGS. 18 and 19 have surface regions 23 which differ from the cylinder-shell or otherwise rotationally symmetrical shape 22. However, provision is preferably made in such cases, as already explained in the introduction, for the surfaces 23 in the compensation region 7 which differ from the cylinder-shell or otherwise rotationally symmetrical shape 22 to be located closer to the axis of symmetry 21, and therefore closer to the drive rotation axis 3, than the cylinder-shell or otherwise rotationally symmetrical shape 22 of the compensation surface 9.

In respect of the exemplary embodiments which have been shown thus far, it should be pointed out that, in addition to the form fit, it is also, of course, possible for the compensation surface 9 and the seat surface 10 to be connected to one another in some other way, preferably in a form-fitting manner by welding or adhesive bonding.

Figure 20:
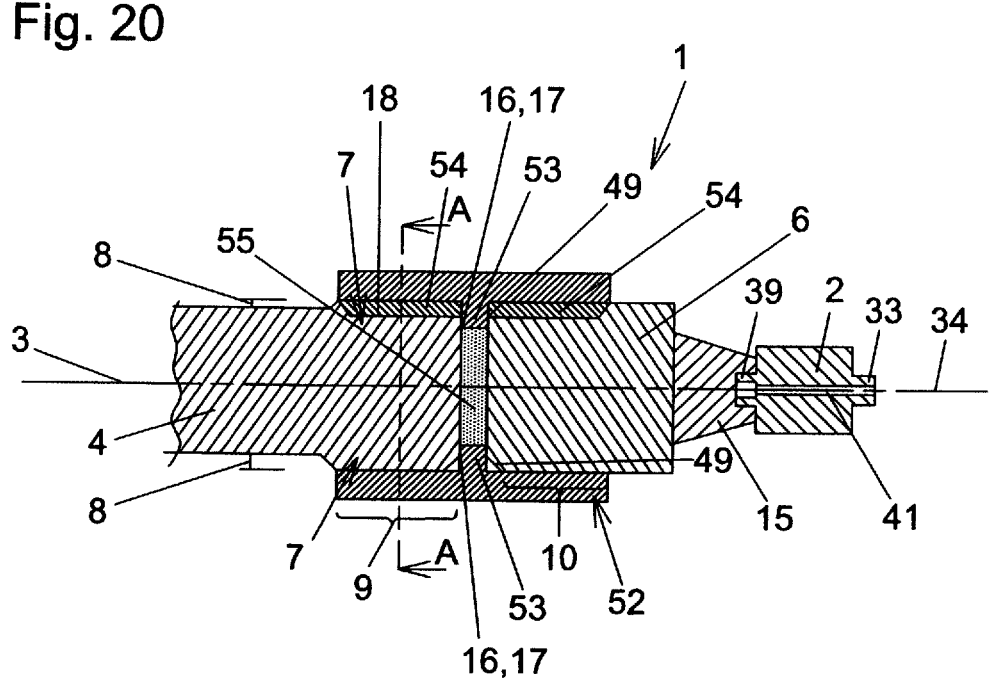
FIGS. 20 and 21 show an exemplary embodiment according to the invention in which the form fit between the compensation surface and seat surface is established via a connecting adapter.
Figure 21:
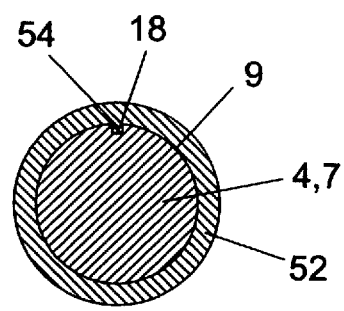

FIGS. 20 and 21, then, show an example in which the form fit between the compensation surface 9 and seat surface 10 serves merely for precise orientation, in order for the workpiece-support parts 4 and 6 thus oriented then to be connected to one another for example integrally. FIG. 20 shows a longitudinal section; FIG. 21 shows the cross section taken along section line AA. In this exemplary embodiment, the form-fitting connection between the compensation surface 9 and seat surface 10 takes place here by virtue of said two surfaces 9 and 10 being pushed in a form-fitting manner into the connecting adapter 52, which in this case is of sleeve-like design. This connecting adapter ensures a precise orientation, in which the workpiece-support parts 4 and 6 are then connected to one another on a permanent basis for example by adhesive bonding 55 or welding, in which case the connecting adapter 52, and therefore the form fit, can then be removed again. It is possible for the connecting adapter 52 to be designed in a number of parts, and to be capable of being dismantled and assembled, or, for removal in the manner of a disposable product, also to be destroyed. The adhesive for the adhesive bonding 55 can be introduced via an opening (not illustrated here) in the connecting adapter 52.

The connecting adapter 52, as shown here, advantageously also has a stop ring 53 for ensuring the precise orientation of the workpiece-support parts in the axial direction and/or an index lug 54 for skewing-prevention purposes.

The skewing-prevention component 18 on the workpiece-support part 4 is designed in this case, in a manner corresponding to the index lug 54, in the form of a longitudinal groove. The machining for making the compensation surface 9, the longitudinal stop 16 and the in this case groove-shaped skewing-prevention component 18 of the workpiece-support part 4 takes place in a manner analogous to the exemplary embodiments outlined above. The seat surface 10 of the workpiece-support part 6 is designed in this case in the form of a cylindrical pin with a longitudinal groove for accommodating the index lug 54, which, of course, constitutes just one of many design options.

KEY TO THE REFERENCE SIGNS

| 1, 1' | Workpiece support |
|---|---|
| 2 | Workpiece |
| 3 | Drive rotation axis |
| 4 | Workpiece-support part |
| 5 | Workpiece-support part |
| 6 | Workpiece-support part |
| 7 | Compensation region |
| 8 | Material overhang |
| 9 | Compensation surface |
| 10 | Seat surface |
| 11 | Cavity |
| 12 | Fastening device |
| 13 | Driveshaft |
| 14 | Machine tool |
| 15 | Workpiece adapter |
| 16 | Longitudinal stop |
| 17 | Material overhang |
| 18 | Skewing-prevention component |
| 19 | Material overhang |
| 20 | Tool |
| 21 | Axis of symmetry |
| 22 | Shape |
| 23 | Surface region |
| 24 | Supporting arm |
| 25 | Vertical axis |
| 26 | Tool-support head |
| 27 | Direction |
| 28 | Direction |
| 29 | Direction |
| 30 | Direction of tool rotation |
| 31 | Tool holder |
| 32 | Tool mount |
| 33 | Connection geometry |
| 34, 34' | Axis of workpiece rotation |
| 35 | Offset |
| 36 | Index pin |
| 37 | Allen screw |
| 38 | Screw |
| 39 | Support adapter |
| 40 | Screw holes |
| 41 | Longitudinal channel |
| 42 | Crown support |
| 43 | Crown |
| 44 | Shoulder |
| 45 | Implant |
| 46 | Through-passage opening |
| 47 | Pin |
| 48 | Index opening |
| 49 | Mating stop |
| 50 | Screw-head aperture |
| 51 | Threaded bore |
| 52 | Connecting adapter |
| 53 | Stop ring |
| 54 | Index lug |
| 55 | Adhesive bonding |

The invention claimed is:

1. A method of correcting an axial position of a workpiece support, comprising:

providing the workpiece support including first and second workpiece-support parts, which are separable from one another and connectable to one another, the first workpiece-support part has a compensation region with an increased diameter material overhang for forming a compensation surface by way of material removal, and the second workpiece-support part has a seat surface for form-fitting connection to the compensation surface;

fastening the first workpiece-support part with the compensation region on a driveshaft of a machine tool, said driveshaft being rotatable about a drive rotation axis;

removing material from the compensation region with a material-removing tool of the machine tool during simultaneous rotation of the driveshaft together with the first workpiece-support part about the drive rotation axis, the material removal resulting in the compensation surface being formed in the compensation region;

connecting the seat surface in a final position on the compensation surface after the material removal via a form-fitting connection to the seat surface; and installing a workpiece in the workpiece support and subsequently machining the workpiece during rotation of the workpiece.

2. The method as claimed in claim 1, further comprising forming the compensation surface such that at least a portion thereof is shaped as a cylinder shell or with an otherwise rotationally symmetrical shape, and an axis of symmetry of the cylinder-shell or the otherwise rotationally symmetrical shape of the compensation surface is coaxial with the drive rotation axis.

3. The method as claimed in claim 2, further comprising forming surface regions in the compensation surface that are recessed inwardly closer to the axis of symmetry than a periphery defined by the cylinder-shell or the otherwise rotationally symmetrical shape of the compensation surface.

4. The method as claimed in claim 1, wherein the workpiece is a dental workpiece on the driveshaft of the machine tool.

5. The method as claimed in claim 1, wherein the first workpiece-support part has a skewing-prevention component machined in the first workpiece-support part.

6. The method as claimed in claim 1, wherein the seat surface encases a cavity.

7. The method as claimed in claim 1, wherein the first workpiece-support part has a fastening device for fastening the workpiece support on the driveshaft of the machine tool, and wherein the second workpiece-support part has a workpiece adapter for fastening the workpiece on the workpiece support.

8. The method as claimed in claim 1, further comprising providing the first workpiece-support part with a longitudinal stop formed thereon, the longitudinal stop comprising an additional material overhang that is shortened, by way of an additional material removal from the additional material overhang.

9. The method as claimed in claim 1, wherein the first workpiece-support part has a longitudinal stop formed thereon, and has a skewing-prevention component formed thereon, the first workpiece-support part being arranged between a third workpiece-support part and the second workpiece-support part, and wherein the first workpiece-support part is fastened to the driveshaft via the third workpiece support part.

* * * * *